United States Patent [19]

Smoot

[11] Patent Number: 4,831,370
[45] Date of Patent: May 16, 1989

[54] VIBRATING FIBER OPTIC DISPLAY HAVING A RESONANT RIBBON DRIVER

[75] Inventor: Bradley J. Smoot, Albuquerque, N. Mex.

[73] Assignee: Honeywell Inc., Minneapolis, Minn.

[21] Appl. No.: 141,367

[22] Filed: Jan. 5, 1988

[51] Int. Cl.$^4$ .............................................. G06F 3/14
[52] U.S. Cl. ............................. 340/755; 340/815.31; 340/706; 310/321
[58] Field of Search ............... 340/755, 706, 705, 814, 340/815.31; 310/321; 73/651

[56] References Cited

U.S. PATENT DOCUMENTS

| | | | |
|---|---|---|---|
| 3,846,784 | 11/1974 | Sinclair | 340/755 |
| 4,311,999 | 1/1982 | Upton et al. | 340/815.31 |
| 4,600,855 | 7/1986 | Strachan | 310/321 |

OTHER PUBLICATIONS

Fisher et al., "Vibrating Display Unit" IBM Technical Disclosure Bulletin, vol. 22, No. 1, Jun. 1979, pp. 6-8.
Wooton, "Phase-Locked-Loop Control of a Tuning Fork Oscillator", IBM Technical Disclosure Bulletin, vol. 22, No. 3, Aug. 1979, pp. 1088-1090.

Primary Examiner—John W. Caldwell Sr.
Assistant Examiner—Alvin Oberley
Attorney, Agent, or Firm—Howard Paul Terry

[57] ABSTRACT

A vibrating fiber optic display unit is provided for use as an aircraft pilot display unit and for overcoming the problem of manually adjusting the display unit due to temperature changes. The display unit has a fiber optic ribbon having a plurality of fibers which form a display pattern at the free ends of the fibers during vibration of the fiber optic ribbon. The ribbon has light emitting diodes for the fibers. A microprocessor provides signals to the diodes for forming light dots in the display pattern. A piezo film transducer is mounted on the ribbon. Drive means vibrates the ribbon. An optocoupler has a shutter portion mounted on the ribbon. A ribbon oscillator network receives signals from the optocoupler and from the piezo film transducer and provides signal to the drive means, whereby the ribbon is vibrated at its natural frequency, and whereby the drive means automatically adjusts to changes in the ribbon natural frequency due to temperature change.

3 Claims, 3 Drawing Sheets

VIBRATING FIBER OPTIC DISPLAY HAVING A RESONANT RIBBON DRIVER

The invention relates to a vibrating fiber optic display. In particular, the invention relates to a vibrating fiber optic display having a resonant ribbon driver and having a ribbon with a piezo film transducer.

BACKGROUND OF THE INVENTION

A prior art vibrating fiber optic display unit is shown and described in U.S. Pat. No. 4,311,999, issued Jan. 19, 1982. A vibrating cantilever beam portion is shown and described in a publication, entitled "Proceedings of IEEE, Volume 70, Number 5, May 1982".

The prior art display unit includes, a cantilevered fiber optic ribbon, an electromechanical drive means for vibrating the ribbon, light emitting diode means for transmitting light through the ribbon to form a display, an optocoupler for detecting the position of the ribbon and for controlling the diode means in response to input signals to form the ribbon display.

One problem with the prior art display unit is that the drive means needs to be manually tuned to match the ribbon resonant frequency, which varies with temperature and which varies with ribbon mass and length.

SUMMARY OF THE INVENTION

According to the present invention, a vibrating fiber optic display unit is provided. Such display unit includes, a cantilevered fiber optic ribbon, an electromechanical drive means for vibrating the ribbon, light emitting diode means for transmitting light through the ribbon to form a display, an optocoupler for detecting the position of the ribbon and for control of the drive means, a piezo film transducer for sensing the position of the ribbon to modify the control of the drive means to maintain the ribbon at its natural resonant frequency, and a microprocessor for energizing the diode means in response to input signals to form the ribbon display.

By using the structure of piezo film transducer with its related circuit, it overcomes the problem of manually tuning the drive means to match the resonant frequency of the ribbon.

BRIEF DESCRIPTION OF THE DRAWINGS

The above advantages and the subsequent description will be more readily understood by reference to the following drawings.

DESCRIPTION OF THE PREFERRED EMBODIMENTS

Figure 1:
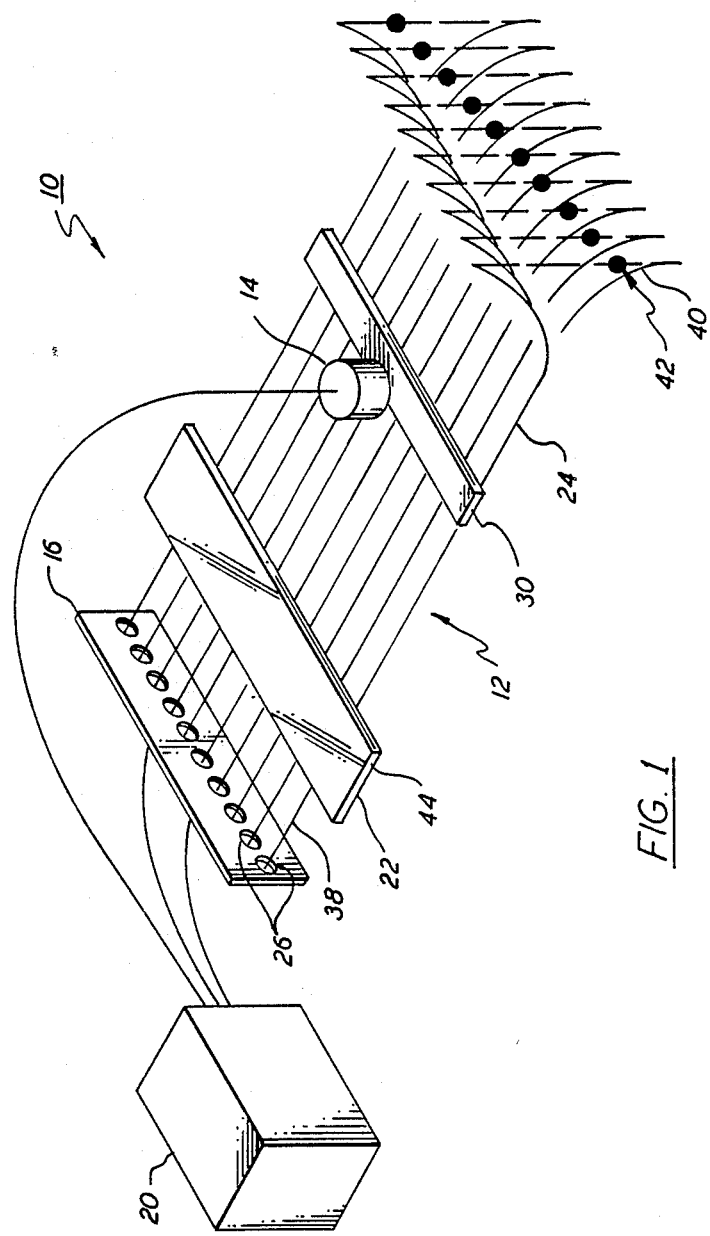
FIG. 1 is a schematic view of a display unit according to the invention.

In FIG. 1, a vibrating fiber optic display unit 10 is shown. Display unit 10 includes a fiber optic ribbon 12, an electromechanical exciter or drive means 14, a visible light emitting diode means 16, an optocoupler 18 (FIG. 2), a microprocessor symbol generator 20, and a piezo film transducer 22.

Display unit 10 is used by a pilot in the operation of an aircraft. Inasmuch as a pilot cannot give sufficient attention to a surrounding environment while watching the aircraft panels, due to the time lapse in moving the eyes of the pilot, a display unit to indicate the surrounding environment is provided for the pilot. This display unit is usually incorporated in a pair of glasses or eyewear for the pilot.

Figure 2:
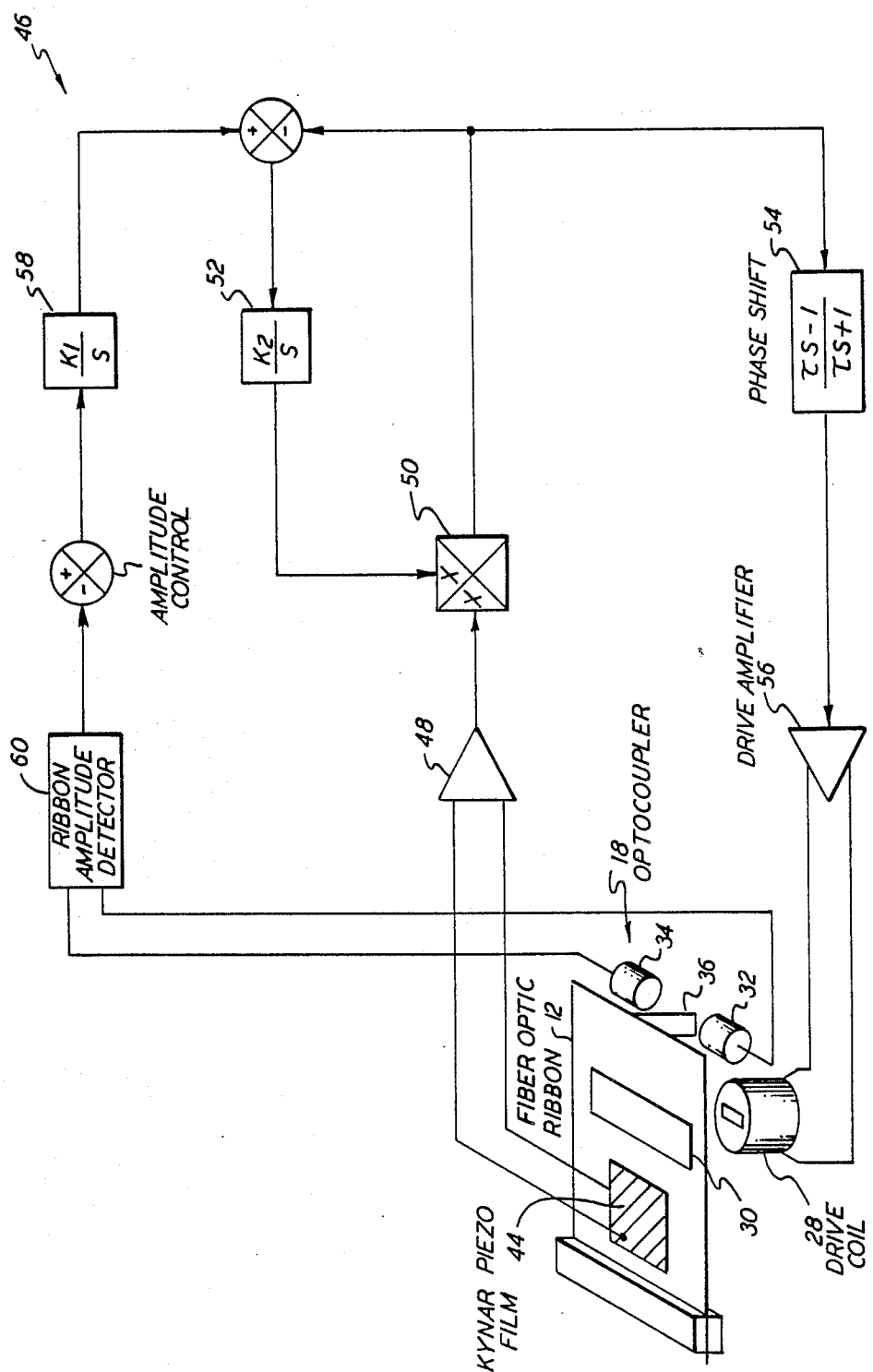
FIG. 2 is a block diagram of a ribbon oscillator circuit of the display unit.

In FIGS. 1 and 2, ribbon 12 has a typical filament or fiber 24, which is identical to nine other adjacent fibers.

Diode means 16 has a typical diode 26 for typical fiber 24. Diode 26 is identical to nine, other, respective, adjacent diodes, that respectively connect to the nine adjacent fibers.

Drive means 14 includes a drive coil 28, and a silicon steel member 30, which is joined to ribbon 12.

Optocoupler 18 includes a light source unit 32, and a light responsive unit 34, and a shutter unit 36, which is mounted on ribbon 12.

Ribbon 12 has a fixed end 38, which is fixedly connected to diode means 16. Ribbon 12 has a free end 40, which translates between fixed limits. Free end 40 forms a two-dimensional display 42. For example, display 42 forms an aircraft pattern or symbol which is created by a series of dots resulting from the excitation of selected ones of the light emitting diodes of diode means 16. Display also forms a pattern representing an aircraft flight path, with the angle of the aircraft to the flight path. Thus, the pilot views the direction of his aircraft and the surrounding environment.

Ribbon 12, in one embodiment, has square, fiber optic fibers of about 1.75 mil thickness, which are spaced apart at about 2.0 mil spacing distance. Ribbon 12 has a top sheathing and a bottom sheathing. The sheathing is about 1.0 mil thickness.

Transducer 22 has a film 44, which is joined to ribbon 12 by an epoxy material. The epoxy is a silver-filled epoxy, which is electrically conductive.

Film 44 is a piezo film, which is sold under the trademark "KYNAR". Film 44 is a piezo film, or piezo-electric film, and is composed of a polyvinylidene fluoride material, and is useful as a sensor of an instrument for monitoring vibration.

Film 44, in this embodiment has a length of 0.300 inches, a width of 0.150 inches and a thickness of about 0.001 inches.

Film 44 provides an electrical signal which is proportional to the mechanical force imparted by the bending motion of the ribbon 12 during vibration. A high impedance voltage follower circuit 48 is used to buffer the signal of the piezo film 44.

In FIG. 2, a ribbon oscillator network 46 is shown. Network 46 includes a high impedance voltage follower circuit 48, a gain multiplier 50, a feedback integrator 52, a phase shift circuit 54, an amplifier 56, an integrator 58, and a ribbon amplitude detector 60.

In FIG. 2, the ribbon position signal, which is generated, is processed through gain multiplier 50 that works in conjunction with feedback integrator 52 to provide automatic gain control. The output of this circuit is then run through phase shift circuit 54 to compensate for the phase lag in the coil drive/ribbon position interface. The output of the phase shift circuit is then amplified by amplifier 56 to drive the exciter coil 28 to vibrate the ribbon 12. An outer loop, consisting of the optocoupler 18, the ribbon amplitude detector 60 and integrator 58, serves to provide an absolute amplitude detector for the network.

Figure 3:
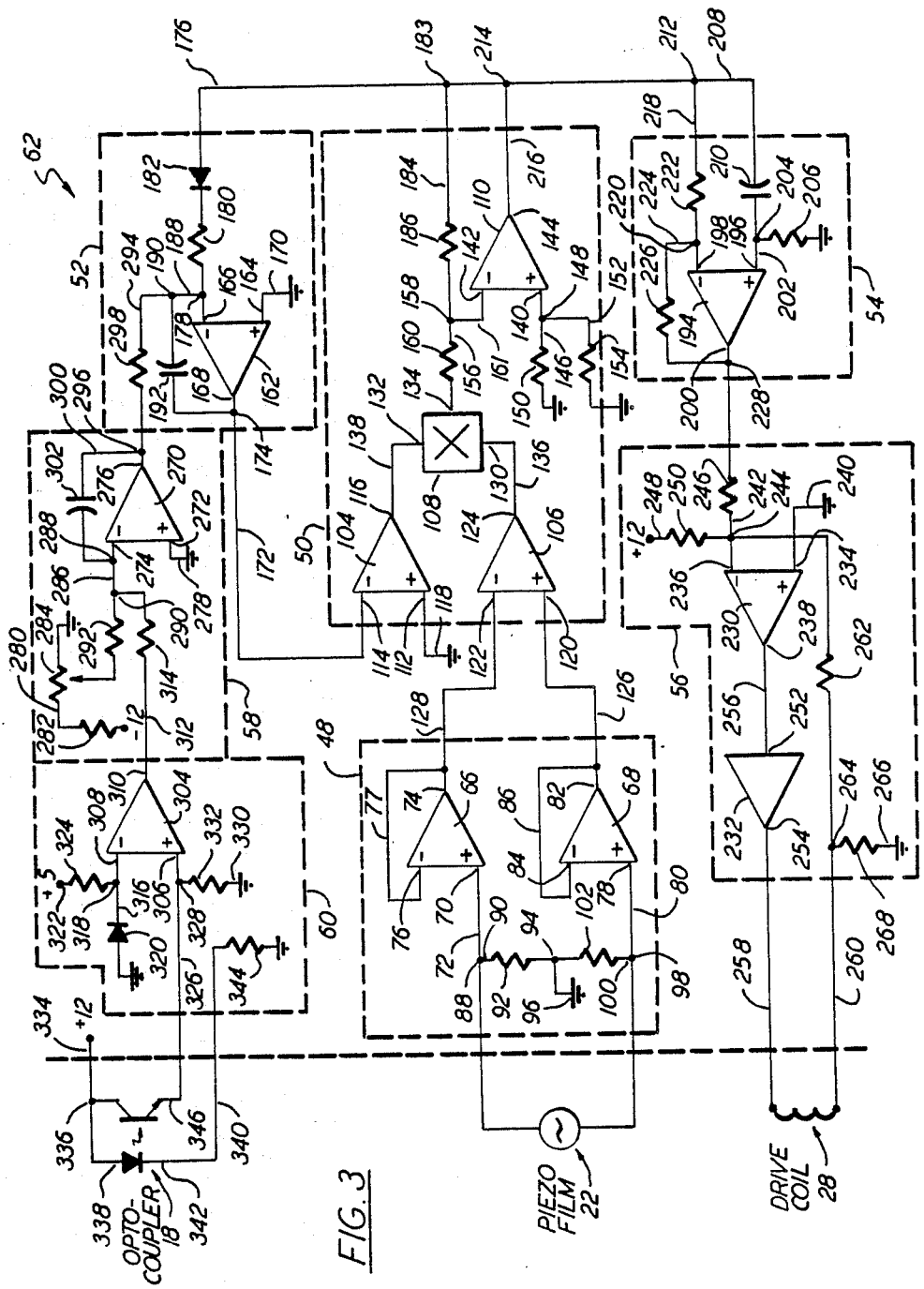
FIG. 3 is a circuit diagram of the ribbon oscillator circuit.

The actual circuit used in the invention is illustrated in FIG. 3. The piezo film transducer 22 provides a signal which is input through the voltage follower circuit 48. This circuit 48 provides high input impedance and good common mode rejection of noise. The output of this circuit 48 is multiplied with the output of the feedback integrator 52 using an analog multiplier 50. The signal of feedback integrator 52 is derived from the output of the multiplier 50 and the amplitude control integrator 58, to produce a gain controlled drive signal from the multiplier 50 to the phase shift circuit 54. The phase shift circuit 54 provides a 90° phase lead to the drive signal to compensate for the 90° phase lag in the ribbon driver electromechanical interface. The phase shifted drive signal is then input to the coil drive circuit 56. This circuit 56 provides a current drive output to the coil 28, that is proportional to the voltage input. This approach minimizes the effect of the coil load variations.

The amplitude of the ribbon vibration is sensed by the optocoupler 18 and input to the ribbon amplitude detector 60. The ribbon amplitude detector 60 converts the optocoupler signal to a pulse width modulated signal, which is then input to the amplitude control integrator 58. The output of this circuit provides an amplitude reference to the feedback integrator 52.

Thus, the optocoupler/amplitude control loop described above is used to eliminate amplitude variations caused by the piezo film transducer's changes over temperature.

FIG. 3 shows the circuit diagram of the ribbon oscillator circuit 62. In FIG. 3, voltage follower circuit 48 includes upper unit 66 and lower unit 68. Units 66, 68 are amplifiers. Unit 66 has a positive input terminal 70 and has a connector 72 from terminal 70 to piezo film 22. Upper unit 66 has an output terminal 74 and has a negative input terminal 76 and has a connector 77 from terminal 74 to negative input terminal 76. Lower amplifier 68 has a positive input terminal 78 and has a connector 80 from terminal 78 to piezo film 22. Lower amplifier 68 has an output terminal 82 and has a negative input terminal 84 and has a connector 86 from terminal 82 to terminal 84.

Connector 72 has a junction 88 with a connector 90. Connector 90 extends from junction 88 through a resistor 92 to a junction 94 and then to ground 96. Connector 80 has a junction 98 with a connector 100. Connector extends from junction 98 through a resistor 102 to junction 94.

In FIG. 3, gain multiplier 50 includes first unit 104, second unit 106, multiplier 108 and third unit 110. Units 104, 106 and 110 are amplifiers. Unit 104 has a positive unit terminal 112, a negative unit terminal 114, and an output terminal 116. Unit 104 has a connector 118 from terminal 112 to ground.

Unit 106 has a positive input terminal 120, a negative input terminal 122, and an output terminal 124. Unit 106 has a connector 126 from terminal 120 to terminal 82. Unit 106 also has a connector 128 from terminal 122 to terminal 74.

Unit 108 has a first input terminal 130, a second input terminal 132, and an output terminal 134. Unit 108 has a connector 136 from terminal 130 to terminal 124. Unit 108 also has a connector 138 from terminal 132 to terminal 116.

Unit 110 has a positive input terminal 140, a negative input terminal 142, and an output terminal 144. Unit 110 has a connector 146 which extends through a junction 148 and through a resistor 150 to ground. Connector 146 connects to another connector 152 at junction 148. Connector 152 extends from junction 148 through a resistor 154 to ground. Unit 110 also has a connector 156 which extends through a junction 158 and through a resistor 160 to terminal 134. A connector 161 extends from terminal 142 to junction 158.

In FIG. 3, feedback integrator 52 has an amplifier unit 162. Unit 162 has a positive input terminal 164, a negative input terminal 166 and an output terminal 168. Unit 162 has a connector 170 from terminal 164 to ground. Unit 162 also has a connector 172 which extends through a junction 174 to terminal 114.

Unit 162 has a connector 176, which extends in series, from terminal 166 through a junction 178, a resistor 180, a diode 182, to a junction 183. Another connector 184 extends from junction 183, through a resistor 186 to junction 158. A connector 188 extends in series, from junction 178 through a junction 190, then through a capacitor 192, to junction 174.

In FIG. 3, phase shift circuit 54 includes an amplifier unit 194. Unit 194 has a positive input terminal 196, a negative input terminal 198, and an output terminal 200. Unit 194 has a connector 202 which extends in series through a junction 204, a resistor 206, to ground. A connector 208 extends in series from terminal 204, through a capacitor 210, a junction 212, another junction 214 to junction 183. A connector 216 extends from junction 214 to terminal 144. A connector 218 extends in series, from terminal 198 through a junction 220, through a resistor 222, to junction 212. A connector 224 extends from junction 220, through a resistor 226, through a junction 228, to terminal 200.

In FIG. 3, amplifier 56 includes unit 230 and unit 232, which are amplifier units. Unit 230 has a positive input terminal 234, a negative input terminal 236, and an output terminal 238. Unit 230 has a connector 240, which extends from terminal 234 to ground. Unit 230 also has a connector 242, which extends in series from terminal 236, through a junction 244, through a resistor 246, to junction 228. A connector 248 extends from junction 244, through a resistor 250, to a +12 voltage source.

Unit 232 has an input terminal 252 and an output terminal 254. A connector 256 extends from terminal 238 to terminal 252. A connector 258 extends from terminal 254 to drive coil 28. A connector 260 extends in series, from terminal 244, through a resistor 262, through a junction 264, to drive coil 28. A connector 266 extends from terminal 264, through a resistor 268, to ground.

In FIG. 3, integrator 58 includes an amplifier unit 270. Unit 270 has a positive input terminal 272, a negative input terminal 274, and an output terminal 276. A connector 278 extends from terminal 272 to ground. A connector 280 extends in series from a −12 voltage source, through a resistor 282, through a resistor 284, to ground. A connector 286 extends in series from terminal 274, through a junction 288, through a junction 290, through a resistor 292, to resistor 284. A connector 294 extends in series, from terminal 276, through a junction 296, through a resistor 298, to terminal 190. A connector 300 extends from junction 296, through a capacitor 302, to junction 288.

In FIG. 3, ribbon amplitude detector 60 includes an amplifier unit 304. Unit 304 has a positive input terminal 306, a negative input terminal 308, and an output terminal 310. A connector 312 extends from junction 290, through a resistor 314, to terminal 310. A connector 316 extends in series, from terminal 308, through a junction 318, through a diode 320, to ground. A connector 322 extends from terminal 318, through a resistor 324 to a +5 voltage source. A connector 326 extends from terminal 306, through a junction 328 to optocoupler 18. A connector 330 extends from terminal 328, through a resistor 332, to ground. A connector 334 extends from a +12 voltage source, through a terminal 336, to an input terminal 338 of optocoupler 18. A connector 340 extends from an output terminal 342 of optocoupler 18, through a resistor 344, to ground. Optocoupler has a second output terminal 346, which connects to connector 326.

The advantages of the display unit 10 are describe hereinafter,

1. Display unit 10 eliminates the need to manually tune the unit.

2. Display unit eliminates external timing elements by using the natural resonant frequency of the ribbon 12 as the frequency determining element on the unit.

3. Display unit 10 uses the natural resonant frequency of the ribbon 12, and senses the position of the ribbon 12, and processes the signal electronically to close the loop with the electromechanical ribbon driver 14.

4. Display unit is self-starting, and eliminates manual adjustment of frequency.

5. Display unit 10 automatically adjusts, and compensates for changes in the resonant frequency caused by ribbon parameter changes, such as temperature, mass, and length.

6. Display unit 10 minimizes drive power because ribbon 12 oscillates at its resonant frequency.

7. Thus display unit 10 achieves a closed loop electromechanical oscillator using a piezoelectric film transducer 22 to sense the motion of ribbon 12. Ribbon oscillator network 46 processes the ribbon position signal and drives the exciter coil 28 in phase with the ribbon motion, so that ribbon 12 oscillates at its mechanical resonant frequency.

While the invention has been described in its preferred embodiments, it is to be understood that the words which have been used are words of description rather than limitation and that changes may be made within the purview of the appended claims without departing from the true scope and spirit of the invention in its broader aspects.

For example, the invention can be used by a deaf person to be able to see sounds. The patterns presented by the display unit, at the ends of the ribbon fibers, can be selected to provide visual assistance to a deaf person for understanding sounds.

The embodiments of an invention in which an exclusive property or right is claimed are defined as follows:

1. A vibrating fiber optic display unit comprising:
a cantilevered fiber optic ribbon having fibers;
an electromechanical drive means for driving the ribbon;
light emitting diode means for transmitting light through the ribbon fibers during vibration to form a display;
a microprocessor for energizing the diode means in response to input signals;
an optocoupler for detecting the position of the ribbon and for control of the drive means;
a piezo film transducer for sensing the position of the ribbon to modify the control of the drive means to maintain the ribbon at its natural resonant frequency; and
a ribbon oscillator network connected to the optocoupler and connected to the piezo film transducer for receiving signals therefrom, and connected to the electromechanical drive means for providing signals thereto for driving the ribbon at its natural resonant frequency; wherein the ribbon oscillator network comprises:
a high impedance voltage follower circuit; connected to the piezo film transducer for receiving signals therefrom;
a gain multiplier connected to the voltage follower circuit for receiving signals therefrom;
a feedback integrator connected to the gain multipler for providing signals thereto and for receiving feedback signals therefrom;
a phase shift circuit connected to the feedback integrator for receiving signals therefrom;
an amplifier connected to the phase shift circuit for receiving signals therefrom and connected to the drive coil for providing signals thereto;
a ribbon amplitude detector connected to the optocoupler for receiving signals therefrom and having an amplitude control; and
an integrator connected to the amplitude control of the ribbon amplitude detector for receiving siganls therefrom and for providing signals to the gain amplifier;
whereby the drive signals provided to said drive coil causes the drive coil to automatically actuate the ribbon at the ribbon natural vibration frequency and the drive coil adjusts automatically to changes in the ribbon natural vibration frequency.

2. The display unit of claim 1 wherein,
said light emitting diode means includes a plurality of identical diodes;
said ribbon includes a plurality of identical fibers respectively connected to said diodes;
each said fiber having a fixed end portion fixedly connected to said diode means and having a free end portion for forming a dot in a pattern to form a portion of a display of two dimensions during vibration of the ribbon;
said drive means includes a drive coil connected to said integrator of the ribbon oscillator network and includes a silicon bar mounted on the ribbon for vibrating the ribbon; and
said optocoupler includes a light source unit and a light receiving unit connected to said ribbon amplitude detector of the ribbon oscillator network and includes a shutter mounted on the ribbon.

3. The display unit of claim 1 wherein,
said piezo film transducer includes a piezoelectric film and an electrically conductive epoxy material for joining the film to the ribbon.

* * * * *